(12) United States Patent
Love

(10) Patent No.: US 8,108,695 B2
(45) Date of Patent: Jan. 31, 2012

(54) SYSTEM FOR MINIMIZING THE POWER CONSUMPTION OF A DEVICE IN A POWER DOWN MODE

(75) Inventor: John Love, Sioux City, IA (US)

(73) Assignee: Gateway, Inc., Irvine, CA (US)

( * ) Notice: Subject to any disclaimer, the term of this patent is extended or adjusted under 35 U.S.C. 154(b) by 834 days.

(21) Appl. No.: 12/154,913

(22) Filed: May 28, 2008

(65) Prior Publication Data
US 2009/0295468 A1  Dec. 3, 2009

(51) Int. Cl.
| G06F 1/00 | (2006.01) |
| G06F 1/26 | (2006.01) |
| H02J 3/00 | (2006.01) |
| H02J 7/02 | (2006.01) |
| H02J 7/04 | (2006.01) |
| H01F 17/00 | (2006.01) |
| H03H 3/00 | (2006.01) |
| H02M 7/5383 | (2007.01) |
| G01R 19/22 | (2006.01) |
| G01R 19/18 | (2006.01) |
| G01R 21/00 | (2006.01) |
| G01R 19/00 | (2006.01) |

(52) U.S. Cl. .......... 713/300; 713/320; 713/340; 307/17; 307/29; 307/31; 320/111; 320/148; 323/355; 323/364; 324/119; 324/120; 363/74; 702/60; 702/64

(58) Field of Classification Search .................. 713/300, 713/320, 340; 307/17, 29, 31; 320/111, 320/148; 323/355, 364; 324/119, 120; 363/74; 702/60, 64
See application file for complete search history.

(56) References Cited

U.S. PATENT DOCUMENTS

| 5,509,068 | A  | * | 4/1996 | Bayless et al. ........... 379/373.01 |
| 6,295,215 | B1 | * | 9/2001 | Faria et al. ..................... 363/37 |
| 7,332,834 | B2 | * | 2/2008 | Lee ................... 307/131 |
| 7,684,164 | B2 | * | 3/2010 | Wong et al. .................. 361/93.6 |
| 2006/0176643 | A1 | * | 8/2006 | Pecore ......................... 361/230 |

* cited by examiner

*Primary Examiner* — Stefan Stoynov
(74) *Attorney, Agent, or Firm* — Thomas|Kayden

(57) ABSTRACT

A system is disclosed for reducing power drain of a component when the component is in a powered down state. The system comprises a power input configured to receive power, a power output to the component, monitor logic configured to monitor a level of power moving between the input and output, and control logic configured to control power transfer between the input and output. The control logic may be in communication with the monitor logic and configured to selectively restrict power flow between the input and output when the monitor logic senses that power flow between the input and output falls below a threshold level. A method comprises checking a power level between the input and output, and if the power level exceeds a threshold, then permitting substantially unrestricted power flow. If the power level is less than the threshold, then restricting the power level between the input and output.

14 Claims, 4 Drawing Sheets

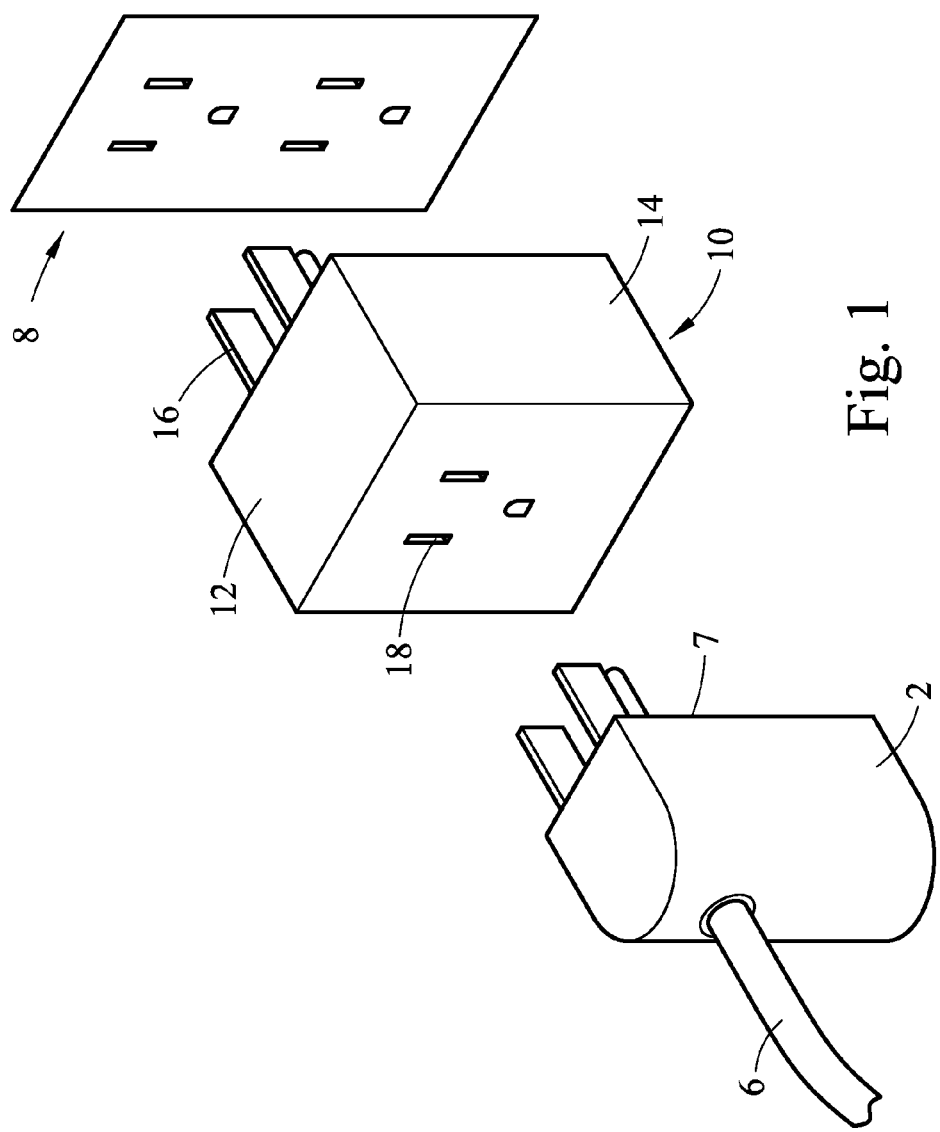

SYSTEM FOR MINIMIZING THE POWER CONSUMPTION OF A DEVICE IN A POWER DOWN MODE

BACKGROUND

1. Field

The present disclosure relates to the power consumption of power supplies, and more particularly pertains to a new system for minimizing the power consumption of a device when in the device is powered down while still providing for the possibility of a minimal power flow to the device while the power consumption is being limited.

2. Description of the Prior Art

Transformers are employed for a multitude of devices that require power at a voltage that is less than the voltage at which power is available. For example, common household power is available at approximately 110 to approximately 120 (or more) Volts, and the components of electronic devices often operate at voltages that are less than one-tenth of the household power voltage. As an example, personal computers employ circuitry that utilizes power at voltages much lower than household voltage, such as about 5 volts. The personal computers thus employ transformers that step down the voltage (as well as other circuitry that processes the power into the required characteristics) to the usable voltage level. While some computers, such as desktop computers, employ transformers that are internal to the housing of the computer, other computers, such as laptop or portable computers, utilize transformers that are incorporated into a wall plug (often referred to as a "wall wart") of the power cord or are integrated into a medial portion of the power cord itself.

The power cords of the devices typically remain plugged into an electrical outlet even when the device is not actively being used, or "powered up" for use, and it is common to leave the power cord for the device, including any transformer integrated into the power cord, connected to the outlet even when the power cord is disconnected from the device. Nevertheless, even through the device may be turned off, or disconnected from the power cord and transformer, the transformer and associated circuitry may continue to consume power from the household power supply so long as the transformer remains in communication with the household power outlet. This small but persistent consumption of power can increase the overall power usage of the house or business and add cost to the power usage, especially when it is considered that a common household will include many such devices for not only operating these devices but also charging batteries that are often incorporated into the devices. However, most users are unaware of the parasitic power consumption and, as a matter of convenience, allow the power cords and transformers to remain plugged into the power outlet during periods of non-use of the device.

Imposing a switch between the transformer and the power outlet would serve to isolate the transformer from the household power supply. Such an approach would require that the transformer be incorporated into the device, which defeats any size or cooling benefits of locating the transformer on the power cord, or would require that the switch be situated in a location inconvenient to the user if the transformer is located on the power cord or on the power plug. In any event, it is often desirable to permit a small amount of power to be available to the device even in the powered-down condition to maintain information in memory, etc., and a switch situated between the transformer and the power outlet would cut off the possibility of that power flow.

It is therefore believed that there exists in the art a need for a system that minimizes the power consumption of a component of a device when in the device is powered down, while still providing for the possibility of a minimal power flow to the device while the power consumption is being limited.

SUMMARY

In view of the foregoing, the present disclosure describes a new system which may be utilized for limiting power consumption by a device when in the device is powered down, while still providing for the possibility of a minimal power flow to the device while the power consumption is being limited.

The present disclosure relates to a new system for reducing power drain of a component when the component is in a powered down state. The system comprises a power input configured to receive power from a power source, and a power output configured to output power to the component. The system includes monitor logic configured to monitor a level of power moving between the power input and the power output, and control logic configured to control power transfer between the power input and the power output. The control logic is in communication with the monitor logic and is configured to selectively restrict power flow between the power input and the power output when the monitor logic senses that power flow between the power input and the power output falls below a threshold level.

In another aspect, the disclosure relates to a method for reducing power drain of a component when the component is in a powered down state. The method comprises providing a system with a power input and a power output, and checking a level of power flow between the power input and the power output. If the level of power flow exceeds a threshold power level, then power flow is permitted between the power input and the power output substantially without restriction. If the level of power flow is less than the threshold power level, then the level of power flow between the power input and the power output is restricted. The restricting of the level of power flow between the power input and the power output does not completely restrict the flow of power between the power input and the power output.

The foregoing is a general outline of some of the more significant aspects of the disclosure, and the detailed description of this application that follows discloses additional features of the disclosure which form the subject matter of the claims appended hereto.

The advantages of the various embodiments of the present disclosure, along with the various features of novelty that characterize the embodiments, are disclosed in the following descriptive matter and accompanying drawings.

BRIEF DESCRIPTION OF THE DRAWINGS

The disclosure will be better understood when consideration is given to the following detailed description thereof. Such description makes reference to the annexed drawings wherein:

FIG. 1 is a schematic perspective view of the new system for minimizing the power consumption of a device according to the present disclosure.

DESCRIPTION OF PREFERRED EMBODIMENTS

Figure 3:
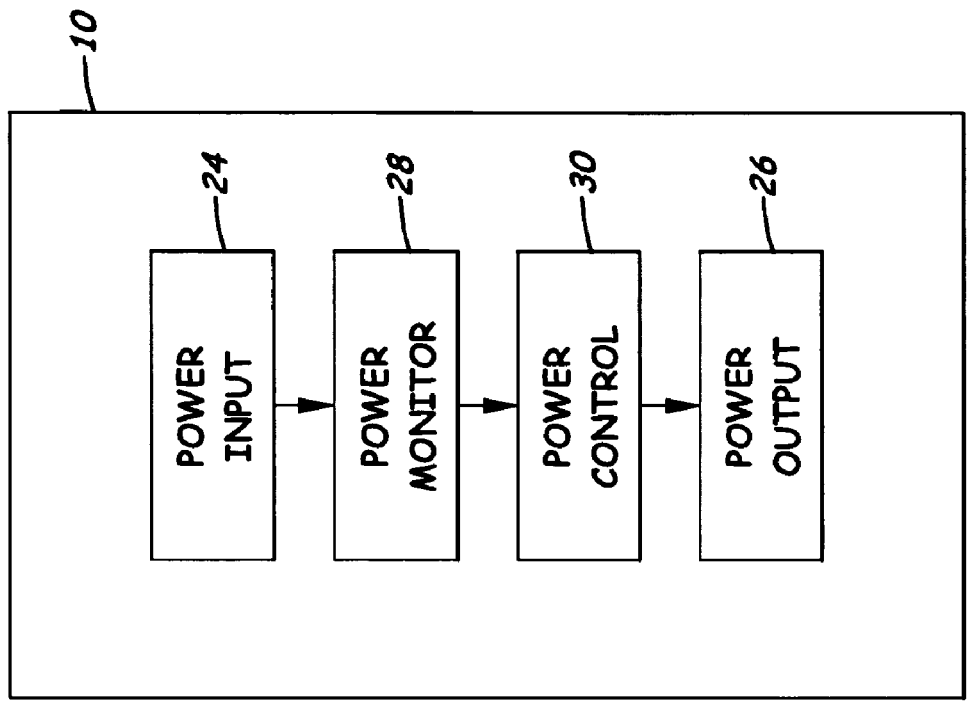
FIG. 3 is a schematic diagrammatic depiction of the system, according to an illustrative embodiment.
Figure 2:
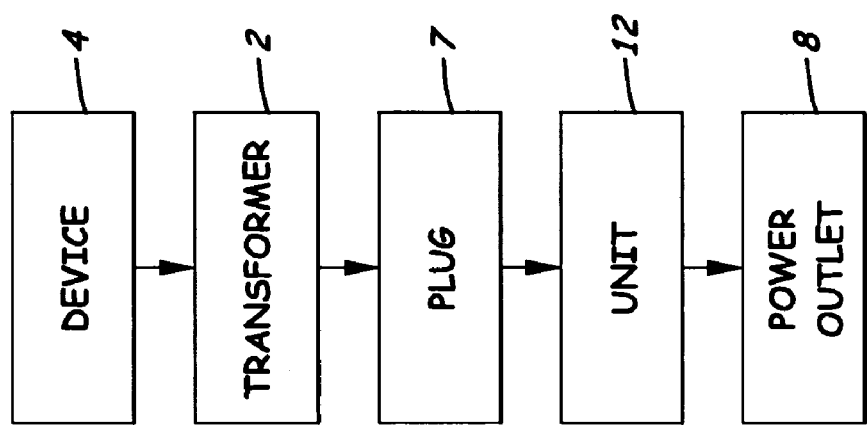
FIG. 2 is a schematic diagrammatic depiction of the system in relation to other associated elements, according to an illustrative embodiment.

With reference now to the drawings, and in particular to FIGS. 1 through 5 thereof, the system for minimizing the power consumption of a device set forth in the present disclosure is generally designated by the reference numeral 10 in this description. A method utilized by the system is also described in this disclosure.

In the following detailed description of preferred embodiment and other embodiments according to the present disclosure, reference is made to the accompanying drawings which form a part hereof, and in which is shown by way of illustration specific preferred embodiments in which the system of the disclosure may be practiced. These embodiments are described in sufficient detail to enable those skilled in the art to practice the system of the disclosure, and it is to be understood that other embodiments may be utilized and that logical, mechanical and electrical changes may be made without departing from the spirit or scope of the disclosure. To avoid detail not necessary to enable those skilled in the art to practice the systems and methods of the disclosure, the description may omit certain information known to those skilled in the art. The following detailed description is, therefore, not to be taken in a limiting sense, and the scope of the present disclosure is defined only by the appended claims.

The system 10 is able to reduce the power consumption of a component 2 of a device 4, or the device itself, when the device is in a powered down state. The system 10 is configured to allow electric power to pass through it, with some modifications being made to the power passing through the system 10 to a connected device 4 under various conditions that will be further described below.

Initially, it should recognized that while the system 10 may be employed with a number of different types of devices in which it may be desirable to minimize power consumption by the device 4, or a component 2 associated with the device, the system and method aspects disclosed in this specification and drawings are highly suitable for use with relatively small electronic devices such as, but not limited to, portable computers, communication devices, personal digital assistants, as well as virtually any devices that employs a transformer to modify the power received by the device.

In various applications, the component 2 may be a power transformer utilized to provide power to a device 4 such as an electronic device with information handling, communication, and/or entertainment functions. In some instances the transformer is a relatively small or medium sized transformer that is utilized to provide power to a device that requires power at a lower voltage than the voltage being supplied, for example, from a power outlet or receptacle providing power at 110 to 120 volts AC. Such transformers may be in the form of a transformer unit that is separate from the device, sometimes called a "wall wart" if a plug and transformer are integrated together in the same housing (see FIG. 1). Further, the transformer may also be enclosed in a housing that is positioned along a medial portion of a power cord 6 for the device 4. It is also possible that the invention could be applied to transformers that are integrated into the main housing or case of the device being powered.

It should also be recognized that the system 10 is capable of reducing or eliminating power consumption of a device 4 that is connected to the system 10 and in a powered down state, such as when a power switch of the device is turned "off". In many electronic devices, the device 4 continues to draw a small amount of power even when the device is turned off by the user. Further, the power cords for devices that include or incorporate a transformer and associated circuitry (such as, for example, the aforementioned "wall-wart") will continue to draw a small amount of power when the device is connected and powered down, and when the device is disconnected from the power cord while the power cord is connected to the electrical power outlet, which is a common situation when the cord and transformer are employed for charging a rechargeable battery for the device. The system 10 is also able to reduce or eliminate the power consumption by the cord-integrated transformer when the device 4 is not connected to the cord.

In some implementations, the system 10 is embodied as a unit 12 that is separate from the device 4 and any power cord 6 of the device. The unit 12 may be adapted to be interposed between the device and the power outlet, while being easily separable from both. Illustratively, the unit 12 may be configured to be plugged into a female electrical plug receptacle, such as, for example, a receptacle on common household electrical outlet or a receptacle on a power distribution strip (which may be connected to an electrical outlet). The unit 12 may also be configured to have a power cord of the device plugged into the unit 12. The unit 12 of the system 10 may include a housing 14, which may be of relatively small size.

In some embodiments, a plurality of input contacts 20 may be mounted on the housing 14, and each of the input contacts 16 may form a blade or prong that is seated in and extends from an input contact recess formed in the housing 14 so that the input contact is insertable into an electrical receptacle. The housing 14 may define a plurality of output contact recesses 18, and a plurality of output contacts 22 may be mounted on the housing, and each of the output contacts 22 may be positioned in or adjacent to one of the output contact recesses. Each of the output contact recesses 18 may form a receptacle for a blade of a plug of a power cord for a device so that the blade when inserted contacts the output contact.

The system 10 may includes power input 24 for inputting or receiving power from a power source, such as means for connecting to a power source. In various embodiments, the power input 24 includes the plurality of the input contacts 20. The system 10 may also include power output 26 for outputting power to a device or a component 2 in communication with the device, and most suitably the component 2 is a power transformer. The power output 26 may thus output power to the transformer. The power output 26 may include the plurality of output contacts 22.

The system 10 may further include monitoring means for monitoring a level of power moving between the power input 24 and the power output 26 of the system 10. Monitor circuitry 28 may include a sensing circuit configured to sense a current level between the power input 24 and the power output 26. The sensing circuit may sense the current flowing between the power input 24 and the power output 26 by sensing a voltage drop between the power input and the power output over a resistance through which the current moves between the power input and output. The sensing circuit may comprise a first resistance 27 (see FIG. 4) and a voltage sensor that is connected so that the sensor detects a voltage drop over the first resistance. The level of resistance exhibited by the first resistance 27 may be relatively low, so the first resistance does not present a significant resistance to power flow between the input 24 and the output 26, but is sufficient to provide a voltage drop when current is applied to the resistance 27. The function of the voltage sensor of the sensing circuit may be performed by the power control circuitry 30, and more specifically the microcontroller 34, which will now be discussed.

The power control circuit 30 of the system 10 may control the level of power that is transferred between the power input 24 and the power output 26. The power control circuitry 30 may be communicatively coupled to the monitor circuitry 28 so that the level of power moving through the system 10 is communicated to the power control circuitry. The power control circuitry 30 may comprise switching circuitry 32 for switching or modifying power flow between the power input 24 and the power output 26. The switching circuitry 32 may be configured to provide a relatively unrestricted path between the power input 24 and the power output 26 and also partially or completely restrict one path between the power input 24 and the power output 26. The switching circuitry 32 may comprise a triac circuit 33 that is interposed in the path between the power input 24 and the power output 26. The triac circuit 33 is able to control the level of power that passes through the triac circuit, and thus control the level of power that passes between the power input 24 and the power output 26 along the first power path 31. A microcontroller 34 may be employed to control the triac circuit 33, and the microcontroller may function as a part of the sensor circuitry that senses the voltage across the first resistor 27. The microcontroller 34 may apply a variable voltage to the gate terminal of the triac circuit 33 so that the triac circuit controls the level of power that is permitted to flow across the triac circuit and thus along the first path between the power input 24 and power output 26.

Figure 4:
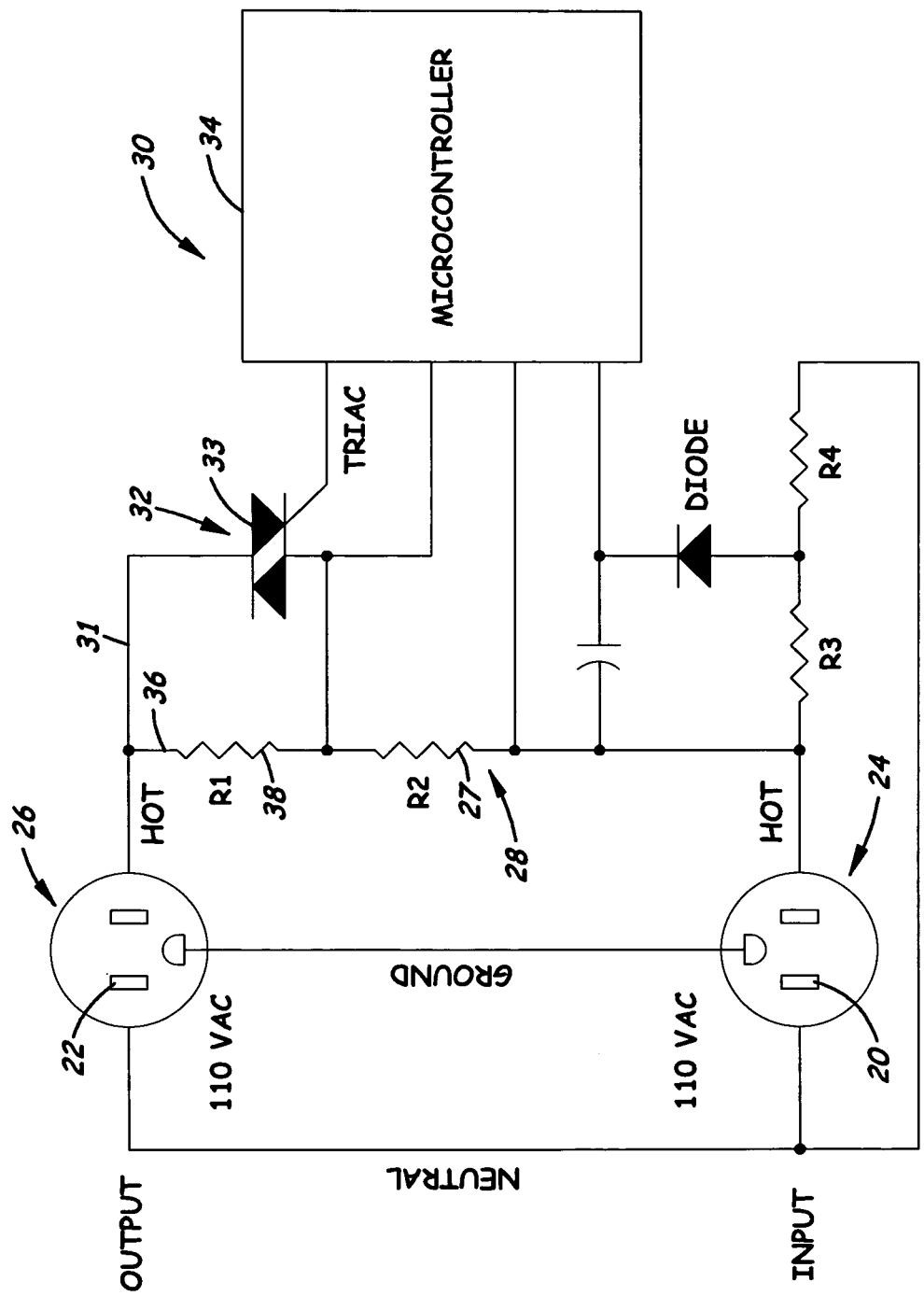
FIG. 4 is a schematic diagrammatic depiction of a circuit implementing the embodiment.

The system 10 may also include means for resisting power flow from the power input 24 and the power output 26 along a second power path 36 between the power input 24 and the power output 26 that does not pass through the power controlling means 30 (see FIG. 4). The second power path 36 thus provides an alternative path to the first power path 31 between the power input 24 and the power output 26. The resisting means may comprise a second resistance 38 that is configured in parallel with the power control circuitry 30. The second resistance 38 may exhibit a relatively high level of resistance that permits only a relatively small amount of current to pass through the resistance 38, for the purpose of providing a small amount of power to the component 2 and the device 4 even when the power control circuitry 30 is blocking power flow along the first path 31.

Figure 5:
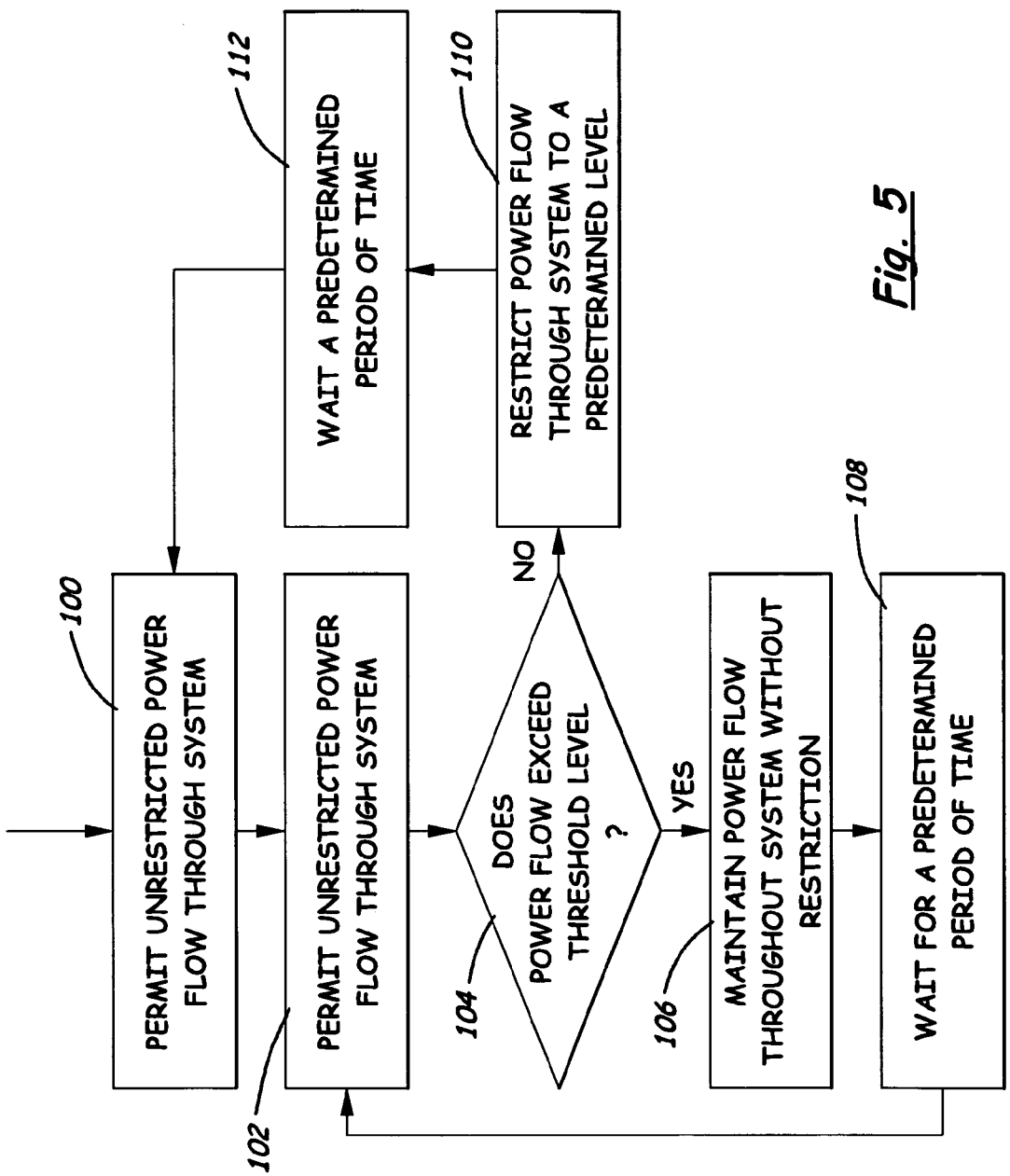
FIG. 5 is a schematic flow diagram of a process implemented in various embodiments of the system.

In one implementation of the system 10, schematically depicted in FIG. 5, the power control circuitry 30 may permit substantially unrestricted power flow through the system 10 between the power input 24 and the power output 26 (block 100), such as by causing the triac to present little or no resistance to power flow between the input 24 and output 26. While the flow of power from the input 24 to the output 26 is relatively unrestricted, the monitor circuitry 28 senses the level of power flowing between the input and output (block 102), such as by sensing the voltage drop over the first resistance 27. If the power flow is detected to be above a threshold level, such as when it is sensed by the microcontroller 34 that the voltage drop over the first resistance exceeds a predetermined level (block 104), then the power control means 28 may maintain the power flow at a relatively unrestricted level (block 106) and may wait for a predetermined period of time (block 108) before the monitor circuitry 28 again senses the level of power flow (block 102).

If the power flow is detected to be equal or less than a threshold level, such as when it is sensed by the microcontroller 34 that the voltage drop over the first resistance is equal or less than a predetermined level (block 104), then the power control circuitry 28 may restrict the power flowing through the system 10 between the power input 24 and the power output 26 (block 110) to a predetermined degree, such as by the microcontroller 34 causing the triac circuit 33 to restrict, or even block, the flow of power through the triac circuit and as a result between the input 24 and output 26. The monitoring means 28 may wait for a predetermined period (block 112) before again permitting an unrestricted flow of power through the system 10 between the input 24 and output 26 (block 100).

Optionally, in other implementations, the system 10 may be embodied as an integral part of the device 4 with the transformer 2 and may utilize various elements of the device 4 in performing the functions set forth. For example, the system 10 may be incorporated into the same housing as the transformer positioned on the power cord. Also, the system 10 may be incorporated into a power outlet strip which includes a plug that is inserted into an electrical outlet, and which includes a housing on which one or more outlets are located.

It should also be recognized that the function of the microcontroller may be performed by any suitable element or elements, such as hardwired circuitry or programmable logic, that performs the functions disclosed herein.

Aspects of the system are disclosed in the description and related drawings directed to specific embodiments of the system. Alternate embodiments may be devised without departing from the scope of the disclosure. Additionally, well-known elements of the system of the disclosure will not be described in detail or will be omitted so as not to obscure the relevant details of the disclosure.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

As the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects. Further, where the term "substantially" is used, it is intended to mean "for the most part" or "being largely but not wholly that which is specified".

I claim:

1. A system for reducing power drain of a component when the component is in a powered down state, the system comprising:
    a power input configured to receive power from a power source; a power output configured to output power to the component;
    monitor logic configured to monitor a level of power moving between the power input and the power output;
    and control logic configured to control power transfer between the power input and the power output;

wherein the control logic is in communication with the monitor logic and is configured to selectively restrict power flow between the power input and the power output when the monitor logic senses that power flow between the power input and the power output falls below a threshold level; and wherein a pair of paths for power flow is defined between the power input and the power output, the control logic being configured to control power flow along a first path of the pair of paths.

2. The system of claim 1 wherein the control logic is configured to periodically permit free flow of power between the power input and the power output, the monitor logic being configured to sense power flow between the power input and the power output when the control logic permits the free flow of power.

3. The system of claim 1 additionally comprising a first resistance configured to resist power flow from the power input to the power output, the first resistance being located along a second path of the pair of paths and in parallel with the control logic controlling the first path such that power is able to flow between the power input and the power output through the first resistance when the control logic blocks power flow.

4. The system of claim 1 wherein the control logic comprises switch logic configured to switch power flow between the power input and the power output such that power flow along the first path may be blocked.

5. The system of claim 4 wherein the switch logic includes a triac circuit and a microcontroller controlling the triac circuit.

6. The system of claim 1 wherein the monitor logic includes sensor logic configured to sense a current between the power input and the power output.

7. The system of claim 6 wherein the sensor logic comprises a voltage sensor configured to sense a voltage over a first resistance between the power input and the power output, the first resistance being located in at least one of a pair of paths.

8. The system of claim 7 wherein a second resistance is located in both of the pair of paths.

9. The system of claim 1 wherein the component comprises a transformer.

10. The system of claim 1 wherein the control logic is configured to periodically permit free flow of power between the power input and the power output, the monitor logic being configured to sense power flow between the power input and the power output when the control logic permits the free flow of power; wherein a pair of paths for power flow is defined between the power input and the power output, the control logic being configured to control power flow along a first path of the pair of paths; a first resistance configured to resist power flow from the power input to the power output, the first resistance being located along a second path of the pair of paths and in parallel with the control logic controlling the first path such that power is able to flow between the power input and the power output through the first resistance when the control logic blocks power flow; wherein the monitor logic includes sensor logic configured to sense a current between the power input and the power output; wherein the sensor logic comprises a voltage sensor configured to sense a voltage over a second resistance between the power input and the power output, the second resistance being located in at least one of the pair of paths; wherein the first resistance is located in both of the pair of paths; wherein the control logic comprises switch logic configured to switch power flow between the power input and the power output such that power flow along the first path may be blocked; wherein the switch logic includes a triac circuit and a microcontroller controlling the triac circuit; a housing, the monitor logic and control logic being mounted on the housing; wherein the power input comprising a plurality of input contacts mounted on the housing; and wherein the power output comprises a plurality of output contacts mounted on the housing.

11. A method for reducing power drain of a component when the component is in a powered down state, the method comprising:

providing a system with a power input and a power output;

checking a level of power flow between the power input and the power output;

if the level of power flow exceeds a threshold power level, then permitting power flow between the power input and the power output without restriction;

if the level of power flow is less than the threshold power level, then restricting the level of power flow between the power input and the power output; and if the level of power flow was determined to be less than the threshold power level and the level of power flow was restricted, then waiting for a period of time, again permitting an unrestricted power flow between the power input and the power output and checking the level of power flow between the power input and the power output.

12. The method of claim 11 additionally comprising permitting an unrestricted power flow between the power input and the power output while checking the level of power flow between the power input and the power output.

13. The method of claim 11 additionally comprising, if the level of power flow was determined to exceed the threshold power level and power was permitted without restriction, then checking the level of power flowing between the power input and the power output after a period of time has passed after checking the level of power flow.

14. The method of claim 11 additionally comprising permitting an unrestricted power flow between the power input and the power output while checking the level of power flow between the power input and the power output; if the level of power flow was determined to exceed the threshold power level and power was permitted without restriction, then checking the level of power flowing between the power input and the power output after a period of time has passed after checking the level of power flow; and if the level of power flow was determined to be less than the threshold power level and the level of power flow was restricted, then waiting for a period of time, again permitting an unrestricted power flow between the power input and the power output and checking the level of power flow between the power input and the power output.

* * * * *